US007317895B2

(12) United States Patent
Weckström et al.

(10) Patent No.: US 7,317,895 B2
(45) Date of Patent: Jan. 8, 2008

(54) METHOD OF CONTROLLING A SATELLITE COMMUNICATION SYSTEM, A TIMING UNIT, AND A CONTROL UNIT OF A TIMING UNIT

(75) Inventors: Mikko Weckström, Helsinki (FI); Jarko Niemenmaa, Espoo (FI); Risto Martikkala, Oulu (FI)

(73) Assignee: Nokia Corporation, Espoo (FI)

( * ) Notice: Subject to any disclaimer, the term of this patent is extended or adjusted under 35 U.S.C. 154(b) by 518 days.

(21) Appl. No.: 10/441,253

(22) Filed: May 20, 2003

(65) Prior Publication Data

US 2004/0021602 A1 Feb. 5, 2004

(30) Foreign Application Priority Data

May 22, 2002 (FI) .................................. 20020964

(51) Int. Cl.
H04B 7/19 (2006.01)
(52) U.S. Cl. ............... 455/13.2; 455/561; 455/502; 455/12.1; 455/456.1; 455/456.5; 342/356; 342/357.09
(58) Field of Classification Search ............... 455/502, 455/561, 456.1, 456.5, 13.2, 12.1; 342/464, 342/442, 356, 427, 455, 357.07
See application file for complete search history.

(56) References Cited

U.S. PATENT DOCUMENTS

| 5,446,465 A | * | 8/1995 | Diefes et al. ......... 342/357.08 |
| 5,727,034 A | * | 3/1998 | Ojaniemi ............... 375/356 |
| 6,188,354 B1 | | 2/2001 | Soliman et al. |
| 6,204,808 B1 | * | 3/2001 | Bloebaum et al. ...... 342/357.07 |
| 6,430,416 B1 | * | 8/2002 | Loomis ................... 455/456.1 |
| 6,795,416 B1 | * | 9/2004 | Han et al. ................ 370/335 |
| 6,892,131 B2 | * | 5/2005 | Coffee et al. ............. 701/200 |
| 6,970,131 B2 | * | 11/2005 | Percy et al. ........... 342/357.07 |
| 2001/0039192 A1 | | 11/2001 | Osterling et al. |
| 2002/0186150 A1 | * | 12/2002 | Sweetapple ............. 340/988 |
| 2003/0122711 A1 | * | 7/2003 | Panasik et al ......... 342/387 |
| 2004/0202119 A1 | * | 10/2004 | Edge ..................... 370/324 |

FOREIGN PATENT DOCUMENTS

| EP | 1 099 955 A2 | 5/2001 |
| EP | 1 146 349 A2 | 10/2001 |
| WO | WO 01/93460 A1 | 12/2001 |

* cited by examiner

Primary Examiner—Matthew Anderson
Assistant Examiner—Sujatha Sharma
(74) Attorney, Agent, or Firm—Squire, Sanders & Dempsey L.L.P.

(57) ABSTRACT

A method of controlling a satellite communication system, a timing unit, and a control unit of a timing unit. The method comprises dividing the coverage area of the satellite communication system into one or several geographical areas; positioning one or several timing units in at least one geographical area; determining which of the satellites of the satellite communication system are visible in each particular geographical area; controlling the timing unit with a control unit, in order to minimize the time difference within the system, to listen to one or several satellites visible in each particular geographical area, the signals received from the satellites by the timing unit fulfilling a predetermined condition; synchronizing a predetermined number of geographical areas with each other by means of the control unit of the system such that the time difference within the system is minimized in a predetermined combination area of geographical areas.

32 Claims, 3 Drawing Sheets

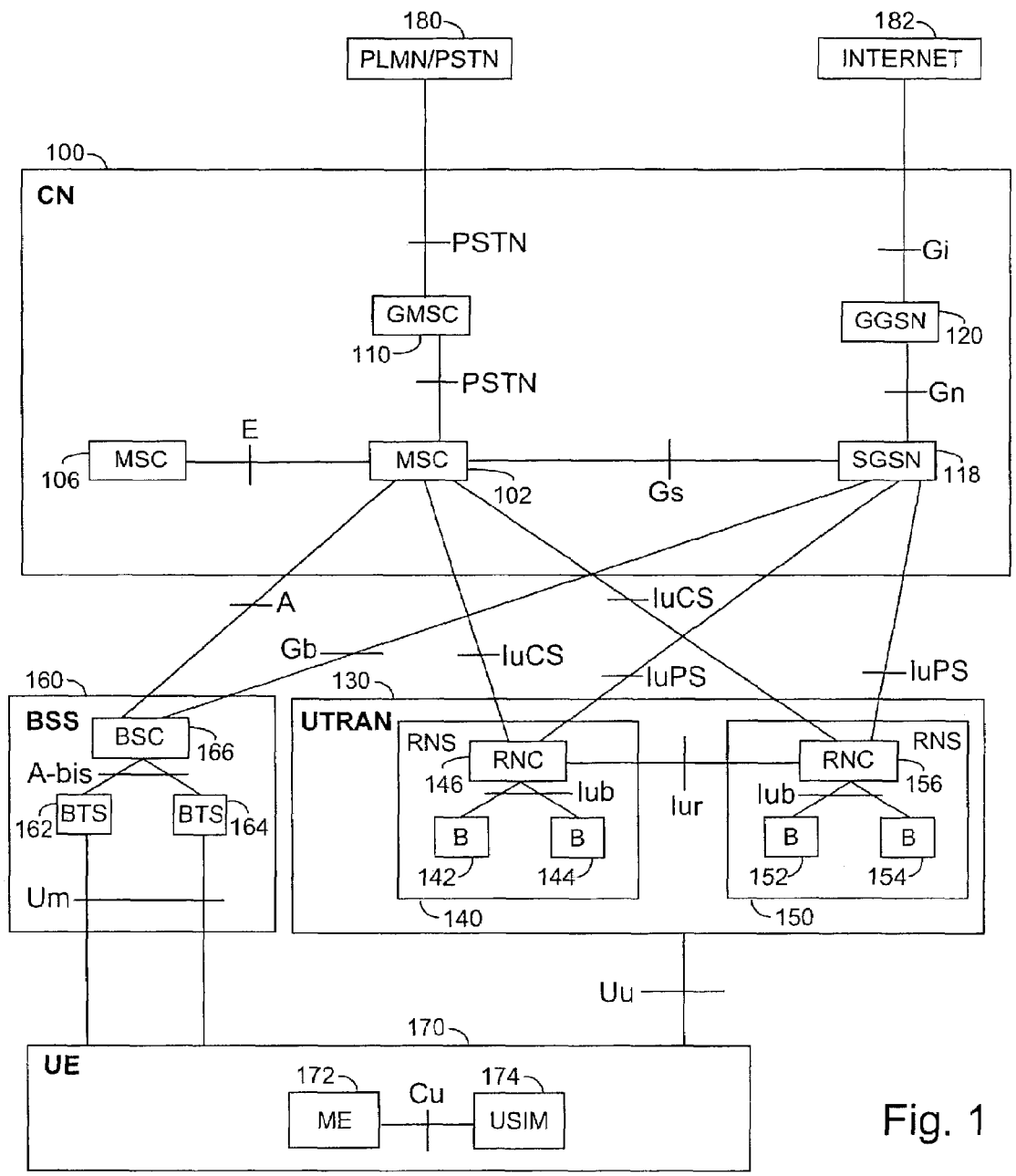
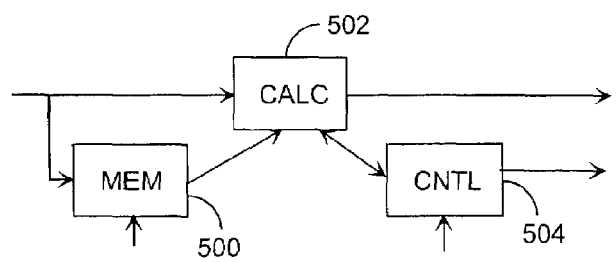
Fig. 5

METHOD OF CONTROLLING A SATELLITE COMMUNICATION SYSTEM, A TIMING UNIT, AND A CONTROL UNIT OF A TIMING UNIT

BACKGROUND OF THE INVENTION

1. Field of the Invention

The invention relates to a method of controlling a satellite communication system which comprises satellites and ground network system devices positioned on earth. The invention also relates to a timing unit and a control unit of a timing unit.

2. Description of the Related Art

Positioning a subscriber terminal, i.e. determining its geographical position, has become an increasingly important function in cellular radio networks. In the United States, for instance, the Federal Communication Commission (FCC) requires that all subscriber terminals calling an emergency call must be positioned even at an accuracy of 50 meters. Positioning applications also include navigation, flight control prediction of continental displacement and meteorology.

In time-synchronized networks, the subscriber terminal could measure the reception time interrelations of the signals received from different base transceiver stations, on the basis of which interrelations the location of the subscriber terminal could be defined. In practice, however, radio systems are not completely time-synchronized, which would cause errors in positioning. This problem has been solved in some positioning methods according to the prior art by bringing into use a location measurement unit (LMU) positioned at a fixed, known measurement point. Such methods include E-OTD (Enhanced Observed Time Difference) and IPDL-TDOA (Idle Period DownLink—Observed Time Difference Of Arrival) methods. By means of the LMU, the real time difference between the transmissions of base transceiver stations is determined. The effect of real time differences is eliminated from the results measured by the subscriber terminal, whereby the location of the subscriber terminal can be determined. The location of the subscriber terminal is obtained from the intersecting point of the hyperbolas expressing the propagation time delays in the coordinates of the base transceiver stations.

In several positioning methods, such as in the E-OTD method, the time difference between the base transceiver station clocks is most frequently determined by using the real time difference (RTD) between the base transceiver stations, which is determined by means of the LMU on the basis of the signals received from the base transceiver stations. A problem with the determination of the time differences between the base transceiver stations based on RTD determinations is, however, that it requires a large amount of calculating capacity. In order to reduce the calculating capacity, what is called the use of absolute time (AT) has been provided.

In the GPS system (GPS, Global Positioning System), a receiver receives a signal transmitted by at least four satellites revolving around the earth, on the basis of which signals it becomes possible to calculate the latitude, longitude and altitude of the subscriber terminal location. All in all, the system contains 24 satellites revolving around the earth. In practice, however, it is often the case that fewer satellites are visible, in which case the accuracy of the positioning is reduced. The visibility of the satellites can be poor in the shadow regions of high buildings and in the vicinity of the poles, for example, because the visibility angles of the satellites are usually small. In the positioning missing satellites can be compensated for by using UTC time (Coordinated Universal Time).

Thus, the calculation of time differences related to the synchronization and positioning of a radio communication system is in many prior art methods based on using absolute time or UTC time (Coordinated Universal Time). However, a problem with the use of absolute time or UTC time is that for different reasons, synchronization errors are caused in the absolute time or UTC time. In systems where a signal is received from a satellite, an error is caused for instance by a radio signal being distorted in the atmosphere. In positioning methods, even a small timing error can cause significant inaccuracy; for instance a timing error of 100 nanoseconds means inaccuracy of about 30 meters in the positioning.

In addition, it can be mentioned as a problem with the GPS system that a GPS receiver is needed for the subscriber terminal, which means, for instance, that the size, weight and costs of the subscriber terminal are increased.

SUMMARY OF THE INVENTION

An object of the invention is to provide an improved control method for a satellite communication system and an apparatus implementing the method. This is achieved with a method of controlling a satellite communication system, which satellite communication system comprises satellites and ground network system devices positioned on earth. The method according to the invention comprises dividing the coverage area of the satellite communication system into one or several geographical areas; positioning one or several timing units in at least one geographical area; determining which of the satellites of the satellite communication system are visible in each particular geographical area; controlling the timing unit with a control unit, in order to minimize the time difference within the system, to listen to one or several satellites visible in each particular geographical area, the signals received from the satellites by the timing unit fulfilling a predetermined condition.

An object of the invention is also a method of controlling a satellite communication system, which satellite communication system comprises satellites and ground network system devices positioned on earth. The method according to the invention comprises dividing the coverage area of the satellite communication system into one or several geographical areas; positioning one or several timing units in at least one geographical area; determining which of the satellites of the satellite communication system are visible in each particular geographical area; controlling the timing unit with a control unit, in order to minimize the time difference within the system, to listen to one or several satellites visible in each particular geographical area, the signals received from the satellites by the timing unit fulfilling a predetermined condition; synchronizing a predetermined number of geographical areas with each other by means of the control unit of the system in such a way that the time difference within the system is minimized in a predetermined combination area of geographical areas.

Further, an object of the invention is a control unit of a timing unit in a satellite communication system. The control unit according to the invention comprises means for determining which of the satellites of the satellite communication system are visible in each particular geographical area; the control unit comprises means for controlling the timing unit, in order to minimize the time difference within the system, to listen to one or several of the satellites visible in each particular geographical area, the signals received from the satellites by the timing unit fulfilling a predetermined condition.

Further, an object of the invention is a control unit of a timing unit in a satellite communication system. The control unit according to the invention comprises means for determining which of the satellites of the satellite communication system are visible in each particular geographical area; the control unit comprises means for controlling the timing unit, in order to minimize the time difference within the system, to listen to one or several of the satellites visible in each particular geographical area, the signals received from the satellites by the timing unit fulfilling a predetermined condition; the control unit comprises means for synchronizing a predetermined number of geographical areas with each other in such a way that the time difference within the system is minimized in a predetermined combination area of geographical areas.

Further still, an object of the invention is a timing unit of a satellite communication system. The timing unit according to the invention comprises means for receiving control commands from the control unit of the timing unit in order to minimize the time difference within the system, the control commands being used to control the timing unit to listen to one or several of the satellites visible in each particular geographical area, the signals received from the satellites fulfilling a predetermined condition.

Preferred embodiments of the invention are described in the dependent claims.

The invention is based on the idea that the number of satellites listened to by the timing unit is limited with the control unit in order to minimize the time synchronization difference within the system.

A plurality of advantages is achieved with the method and system according to the invention. The method and system according to the invention provide an improvement in the accuracy of the synchronization information of the system and thus also in different positioning applications, for example. In addition, the invention provides the advantage that less expensive oscillator components can be used. Possible deterioration of the oscillator as the time passes does not necessarily cause more errors in the positioning.

BRIEF DESCRIPTION OF THE DRAWINGS

Preferred embodiments of the invention will now be described by way of example, with reference to the attached drawings, of which FIG. 1 is a simplified block diagram illustrating a structure of a radio communication system;

FIG. 5 illustrates an example of the control unit of a timing unit;

DETAILED DESCRIPTION OF THE PREFERRED EMBODIMENTS

Figure 2:
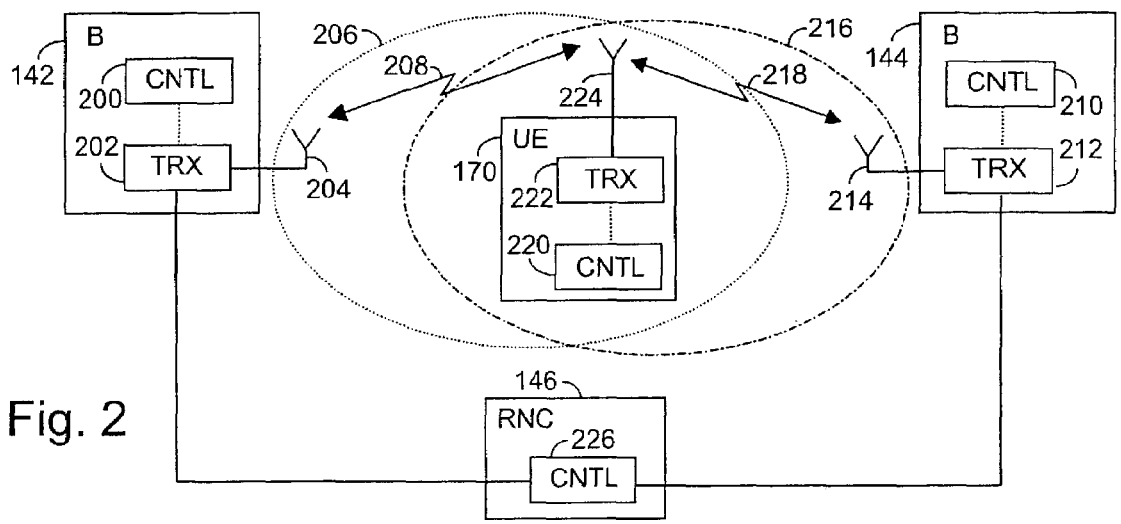
FIG. 2 is a simplified block diagram illustrating a structure of a WCDMA radio communication system.

A method of controlling a satellite system according to the invention can be applied to, for example, positioning methods based on the use of common synchronization of absolute time or other corresponding system. The method can be used not only for positioning devices, such as mobile phones, but also for synchronizing telecommunication systems, such as mobile phone systems or the Internet, in general.

In the following, some positioning methods are described in more detail. Positioning methods are often divided into network-based and subscriber-terminal-based methods. In subscriber-terminal-based positioning methods, the subscriber terminal can perform measurements of signals transmitted by several different base transceiver stations.

In the E-OTD method, which can be regarded as a combination of network-based and subscriber-terminal-based methods, the subscriber terminal measures the inter-relations of the reception times of signals received from different base transceiver stations. This is not sufficient, however, because a radio network, for instance a GSM network, is not in practice synchronous, but also the synchronization difference of the base transceiver stations must be found out. This can be implemented by receiving the signals transmitted by base transceiver stations not only in the subscriber terminal but also in a location measurement unit (LMU) positioned at a fixed, known measurement point. Thus, the time delays of the base transceiver stations are determined by means of the LMU, after which the location of the subscriber terminal is determined on the basis of the geometrical components obtained from the time delays. The geometric time difference (GTD) is thus the observed time difference (OTD) from which the effect of the real time difference (RTD) is subtracted.

A location measurement unit LMU can preferably be positioned in connection with a base transceiver station; in other words the LMU can be located in the base transceiver station itself, for instance in its control part or as a device connected to the base transceiver station, for example positioned in a radio mast. In such a case, it can utilize base transceiver station antennas and transceiver units, for example. The location measurement unit LMU can, however, function as a separate unit as well, being typically connected to the base transceiver station via a radio path.

In the E-OTD method, a subscriber terminal thus receives a signal from at least three different base transceiver stations, the locations of which are known and one of which functions as a base transceiver station serving the subscriber terminal and at least two of which function as neighbouring base stations. The subscriber terminal measures the observed time differences OTD between the serving base station and the two neighbouring base stations, reporting them to the serving mobile location centre (SMLC). Further, the real time difference RTD between the base transceiver station serving the subscriber terminal and its neighbouring base stations is determined by means of a known location measurement unit LMU.

The E-OTD method can be further improved by using AT reporting. This can be implemented in such a way that a GPS receiver is positioned in the location measurement unit LMU, for example, the GPS time of the GPS receiver being used to determine the absolute time (AT), i.e. AT value, of the reference base station or the serving base station, which AT value is then reported to the serving mobile location centre (SMLC). The location measurement unit LMU thus reports to the location centre not only the RTD values of the base transceiver stations it has measured but also the absolute time of the reference or serving base station.

Because second-generation (2G) radio systems and third-generation (3G) radio systems and various combinations thereof, i.e. so-called 2.5-generation (2.5G) radio systems, are already used worldwide and being continuously developed, the embodiments are described in a simplified manner in the radio system illustrated in FIG. 1, which comprises network elements of different generations in parallel. In the description, GSM (Global System for Mobile Communications) represents the second-generation radio systems, and a GSM-based radio system, which employs EDGE (Enhanced Data Rates for Global Evolution) technology for increasing the data transmission rate and can also be used for implementing packet transmission in a GPRS system (General Packet Radio System), represents the third generation radio systems. Also a radio system known at least as IMT-2000 (International Mobile Telecommunications 2000) and UMTS (Universal Mobile Telecommunications System) represents the third-generation radio systems. In its present form, the EDGE system is often considered to represent the 2.5G systems. The embodiments are, however, not restricted to these systems described by way of example, but a person skilled in the art can also apply the instructions to other radio systems containing corresponding characteristics.

FIG. 1 is a simplified block diagram, which illustrates the most essential parts of a radio system, on the network element level, and the interfaces between them. The structure and functions of the network elements are not described in greater detail because they are commonly known.

The main parts of the radio system include a core network (CN) 100, a radio access network 130 (UTRAN, UMTS Terrestrial Radio Access Network) and user equipment (UE) 170. The radio access network 130 belongs to the third generation and is implemented by wideband code division multiple access (WCDMA) technology. In addition, FIG. 1 shows a base station system (BSS) 160, which belongs to the generation 2/2.5 and is implemented by time division multiple access (TDMA) technology.

The structure of the core network 100 corresponds to that of the combined GSM and GPRS systems. The GSM network elements take care of the implementation of circuit-switched connections, and the GPRS network elements take care of the implementation of packet-switched connections. However, some of the network elements are included in both systems.

A mobile services switching centre (MSC) 102 is a centre of the core network 100 on the circuit-switched side. The same mobile services switching centre 102 can be used to serve the connections of both the radio access network 130 and the base station system 160. Typically, the mobile services switching center's 102 tasks include switching, paging, location registration, handover management, collection of subscriber billing information, encryption parameter management, frequency allocation management and echo cancellation.

The number of mobile services switching centers 102 may vary: a small network operator may only have one mobile services switching centre 102, but large core networks 100 may comprise a plurality of them. FIG. 1 shows a second mobile services switching centre 106, but its connections to other network elements are not shown for clarity of FIG. 1.

In large core networks 100 there may be a separate gateway mobile services switching centre (GMSC) 110, which takes care of circuit-switched connections between the core network 100 and external networks 180. The gateway mobile services switching centre 110 is located between the mobile service switching centers 102, 106 and the external networks 180. The external network 180 may be, for instance, a public land mobile network (PLMN) or a public switched telephone network (PSTN).

Typically, the core network 100 also comprises other parts, for instance a home location register (HLR), which includes a permanent subscriber register and, if the radio system supports GPRS, a PDP (Packet Data Protocol) address and a visitor location register (VLR), which includes roaming information on user equipments 170 in the area of the mobile services switching centre 102. For the sake of clarity, FIG. 1 does not show all the parts of the core network.

A serving GPRS support node (SGSN) 118 is a centre of the core network 100 on the packet-switched side. The main function of the serving GPRS support node is to transmit and receive packets with the user equipment 170 that supports packet-switched transmission, using the radio access network 130 or the base station system 160. The serving GPRS support node 118 includes subscriber and location information on the user equipment 170.

A gateway GPRS support node (GGSN) 120 is a packet-switched side counterpart of the circuit-switched side gateway mobile services switching centre 110, with the difference, however, that the gateway GPRS support node 120 must be able to route outgoing traffic from the core network 100 to external networks 182, whereas the gateway mobile services switching centre 110 only routes incoming traffic. In the example, the Internet represents the external networks, through which considerable part of the wireless telephone traffic may pass in the future.

The base station system 160 consists of a base station controller (BSC) 166 and base transceiver stations (BTS) 162, 164. The base station controller 166 controls the base station 162, 164. In principle, the aim is that the devices that implement the radio path, and the functions related thereto, are located at the base station 162, 164, and the control devices are located in the base station controller 166. Naturally, the implementation may also deviate from this principle.

In general, the base station controller 166 takes care of the following tasks, for instance: radio resource management of the base station 162, 164, intercell handover, frequency management, i.e. frequency allocation to the base stations 162, 164, management of frequency hopping sequences, measurement of time delays in the uplink, operation and maintenance of interface and power control management.

The base station 162, 164 includes at least one transceiver, which implements one carrier. In GSM systems, one carrier generally comprises eight time slots, i.e. eight physical channels. One base station 162, 164 may serve one cell or a plurality of sectorized cells. The diameter of the cell may vary from a few meters to tens of kilometers. The base station 162, 164 is often considered to comprise a transcoder, which performs conversion between the speech coding used in the radio system and the speech coding used in the public telephone network. In practice, however, the transcoder is generally physically located in the mobile services switching centre 102. In general, the base stations 162, 164 have the following tasks, for instance: calculation of timing advance (TA), uplink measurements, channel coding, encryption, decryption and frequency hopping.

The radio access network 130 consists of radio network subsystems 140, 150. Each radio network subsystem 140, 150 consists of radio network controllers (RNC) 146, 156 and B nodes 142, 144, 152, 154. The B node is a relatively abstract concept, and therefore the term base station is often used instead.

The radio network controller 140, 150 corresponds approximately to the GSM base station controller 166 as regards its functionality, and the B node 142, 144, 152, 154 corresponds to the GSM base station 162, 164. There are also solutions in which the same device is both the base station and the B node, i.e. said device can implement both the TDMA and the WCDMA radio interfaces at the same time.

The user equipment 170 consists of two parts: mobile equipment (ME) 172 and a UMTS subscriber identity module (USIM) 174. Naturally the GSM system employs the system-specific identity module. The user equipment 170 comprises at least one transceiver, which implements a radio connection to the radio access network 130 or to the base station system 160. The user equipment 170 may comprise one or several subscriber identity modules. In addition, the user equipment 170 comprises an antenna, a user interface and a battery. Currently, there is a wide variety of user equipment 170 available, for instance vehicle-mounted and portable ones. The user equipment 170 is also provided with the same features as personal and portable computers.

USIM 174 comprises user-related data, and in particular, data related to information security, for instance an encryption algorithm.

Next, interfaces between different network elements shown in FIG. 1 are presented gathered in Table 1. It is apparent to a person skilled in the art that interfaces included in the radio telecommunication system are determined by each particular apparatus implementation and the standard used, and consequently the interfaces of the system may deviate from those of FIG. 1. The most important interfaces in the UMTS include an Iu interface between the core network and the radio access network, the Iu interface being divided into a circuit-switched interface IuCS and a packet-switched interface IuPS, and a Uu interface between the radio access network and the user equipment. In the GSM, the most important interfaces include an A interface between the base station controller and the mobile services switching centre, a Gb interface between the base station controller and the serving GPRS support node, and a Um interface between the base station and the user equipment. The interface defines by what kind of messages different network elements can communicate. The objective of the interface standardization is that the network elements of various manufacturers would be able to communicate in the radio system. However, in practice, some of the interfaces are manufacturer-dependent.

TABLE 1

| Interface | Between network elements |
|---|---|
| Uu | UE-UTRAN |
| Iu | UTRAN-CN |
| IuCS | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| E | MSC-MSC |
| Gs | MSC-SGSN |
| PSTN | MSC-GMSC |
| PSTN | GMSC-PLMN/PSTN |
| Gn | SGSN-GGSN |
| Gi | GGSN-INTERNET |

Next, a cellular WCDMA radio telecommunication system is illustrated by means of FIG. 2. FIG. 2 shows part of a simplified radio system, which comprises a subscriber terminal 170, two base stations 142, 144 and a base station controller 146. The first base station 142 comprises a transceiver 202, an antenna 204 and a control block 200. Likewise, the second base station 144 comprises a transceiver 212, an antenna 214 and a control block 210. The base station controller 146 also comprises a control block 226. The user equipment 170 also comprises a conventional transceiver 222 and an antenna 224 for implementing a radio connection, as well as a control block 220. The transceivers 202, 212, 222 employ CDMA (Code Division Multiple Access) technology. In the CDMA technology, the radio resources are allocated to each user by means of user-specific codes. The technology is commonly known, so it is not described in greater detail herein. The antennas 204, 214, 224 can be implemented by conventional, known technology, for instance as omnidirectional antennas or antennas using a directional antenna beam.

In the radio telecommunication system, the radio cells generated by the base stations generally overlap to some extent in order to provide good coverage. This is illustrated in FIG. 2 by a radio cell 206 generated by the base station 142 and a radio cell 216 generated by the base station 144. In current radio telecommunication systems, wireless telecommunication connections are created such that there is a radio link between the user equipment and the base stations, i.e. the calls or data transmission connections between the different user equipment units are created through base stations. Radio links 208, 218 illustrate this in FIG. 2. In particular, FIG. 2 illustrates a situation, where a user equipment 170, which may be mobile, has a radio connection to a first base station 142, for instance, and at the same time it measures common pilot channels of the first and the second base stations 144 for possible handover. A typical situation is that the radio connection of the user equipment is handed over to the carrier of the second base station when the new cell has free capacity and the new connection is of better quality. Channel and cell handovers enable the continuity of the radio connection as the user equipment moves or the physical radio channel changes as a function of time.

The control blocks 200, 210, 220, 226 refer to a block that controls the operation of the equipment and that is currently implemented as a processor with software, but various hardware implementations are also possible, for instance a circuit constructed of separate logic components or one or more application-specific integrated circuits (ASIC). Combination of these different implementations is also possible. When selecting the implementation, a person skilled in the art will take into account requirements set for the size and power consumption of the device, necessary processing power, manufacturing costs and production volume.

Literature and standards of the field will provide further information on the radio telecommunication systems.

In the following, a method of controlling a satellite communication system is described with reference to the flow chart of FIG. 3. Embodiments of the method are described by means of a cellular radio application, but as noted before, the method can also be applied to other objects of application. Briefly, the method is used to minimize the time difference within the system.

Accurate synchronization information within the system is needed in a plurality of applications, such as in mobile phone positioning or synchronization of telecommunication systems, such as mobile phone systems or the Internet. Subscriber terminals may have a connection to satellites only, or timing information may be transmitted to subscriber terminals via network devices positioned on earth if the subscriber terminals need timing information.

In the present application, a satellite communication system refers to a system typically comprising several satellites positioned in orbit revolving around the earth, which satellites are controlled with earth stations (a satellite system), and at least one ground network system positioned on earth. A ground network system positioned on earth may be, for instance, a cellular radio system comprising base transceiver stations and base station controllers as well as subscriber terminals. A ground network system may also be an Internet system, for example, or a combination of a cellular radio system and the Internet.

The method described in the following can be applied to systems that need accurate time synchronization within the system or measurement of the time synchronization within the system.

Performance of a preferred embodiment of the method starts in block 300. In block 302, the coverage area of the satellite communication system is divided into one or several geographical areas. These geographical areas can be in a cellular radio system partly or completely the same as the radio cells of the cellular radio system. Radio cells are usually formed in accordance with the coverage areas of base transceiver stations. The number of radio cells depends on the size of the system and the communication frequency: the larger the area and/or the more frequent the communication, the more cells are usually needed.

In block 304, one or more timing units are positioned in at least one geographical area. The task of the timing units is to listen to the visible satellites to follow the synchronization information. The timing units may also be responsible of other tasks, such as measurement of signals received from either satellites, base transceiver stations or subscriber terminals.

Next, in block 306 it is determined which satellites of the satellite communication system are visible in each particular geographical area. The determination can be performed as follows, for instance: the satellites visible in each particular geographical area are known to the system for instance in the form of a table in the base station controller or timing unit controller.

In block 308, the timing unit is controlled with a control unit to listen to one or several of the satellites visible in each particular geographical area, the signals received from the satellites fulfilling a predetermined condition. Thus, the time difference within the system is minimized. The time difference within the system is minimized, because the timing units do not attempt to listen to satellites that are poorly or hardly at all visible; signals from these satellites may be too weak or distorted from the viewpoint of reliable timing information.

Let us take the GPS system as an example: the system is designed in such a way that in principle, there are always at least four satellites visible. In practice, however, the situation changes, for instance due to ground obstacles. The farther away from the equator one is, the smaller the visibility angles of the satellites, so that shadow regions caused by different ground obstacles are very probable in the vicinity of the circumpolar areas. In addition, due to the orbits of the satellites, the satellites do not cover the earth's surface evenly, but there are fewer satellites visible in the circumpolar areas than in the equator.

Another aspect to be taken into account is that the clock signals of different satellites are delayed in the atmosphere in different ways, due to the elevation angle, for example. Thus, if the system limits the number of satellites listened to by timing units, also the number of clocks having different times is limited and thus the time difference within the system is minimized.

The atmosphere also causes signal distortion, for example via multipath propagation. These distortions can be corrected in military applications by utilizing two GPS frequencies. In civil applications, there is no such a possibility, at least for the time being. The multipath properties of different signals are different, whereby the effect of the multipath propagation on the accuracy of the synchronization information can be reduced, in particular in civil applications, in accordance with the present embodiment of the method according to the invention by reducing the number of satellites listened to by timing units.

The control unit can be positioned for instance in the unit controlling the base transceiver stations of a ground network system or in the base transceiver station or radio mast of a ground network system.

In other words, it is known on the basis of the visibility table which satellites the timing unit can hear, and the satellites that the timing unit is commanded to listen to are selected from among these satellites. Another option is to inform the timing unit about which satellites it must not listen to. Measurement results, for instance, can function as the selection criteria: the satellite from which the timing unit receives the strongest signal or the satellites whose signal strengths in the timing unit exceed a set threshold value preferably during the whole of the 24 hours is/are selected. The threshold value can be, for example, a measurement-verified minimum value with which the timing unit still receives a reliable signal, or the average of the signal strengths. There are also other options for determining the threshold value. The threshold value typically varies in accordance with the object of application: the more accurate timing is needed, the more carefully the satellites to be listened to are selected. The control unit can be used to control one or several timing units.

A second embodiment of the method allows geographical areas to be combined into a larger entity, in other words for example in a cellular radio network, control areas of different base station controllers can be combined into a larger network. In such a case, a predetermined number of geographical areas are synchronized with each other in accordance with block 310 by means of the control unit of the system in such a way that the time difference within the system is minimized in a predetermined combination area of geographical areas. Thus, a predetermined number of geographical areas are synchronized with each other with the control unit of the system in such a way that the control units command the timing units to listen to at least substantially the same satellites. In a small geographical area, the satellites to be listened to can be completely the same, but if the geographical area is sufficiently large, it can be in practice impossible to listen to exactly the same satellites. In such a case, different timing units can listen to mainly the same satellites, but for example one of the satellites to be listened to may be different, or those timing units that are capable of listening to exactly the same satellites do so and those timing units that cannot hear a satellite listened to by others due to a shadow area can be controlled to listen to a substitutive satellite.

Performance of the method is terminated in block 312. An arrow 314 indicates the difference between the two embodiments of the method: the first embodiment does not include method step 310. This can be the case for instance when the coverage area of the system is small. An arrow 316 indicates that the method can be repeated without a division into geographical areas or positioning of timing units if these steps have been performed earlier. The method can be repeated in other ways as well.

It is to be noted that although the number of satellites listened to by timing units is restricted, the rest of the devices in the system can also listen to those satellites that the timing units do not listen to. Also the timing units can listen to other satellites for a purpose other than for synchronizing the system. Such a purpose can be, for example, obtaining measurement information.

Figure 4:
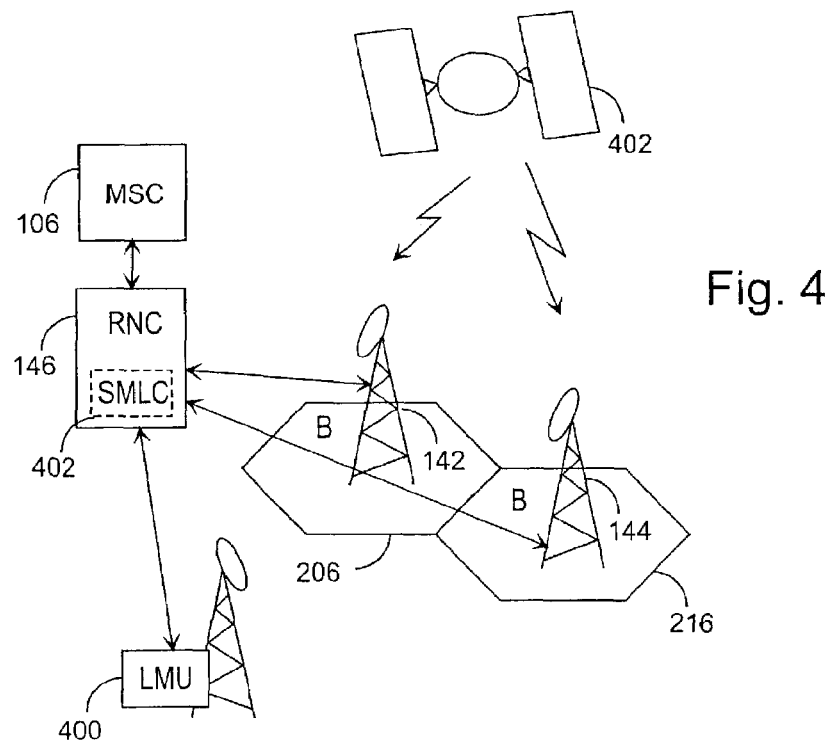
FIG. 4 illustrates a part of a radio communication system, to which the control method can be applied.
Figure 3:
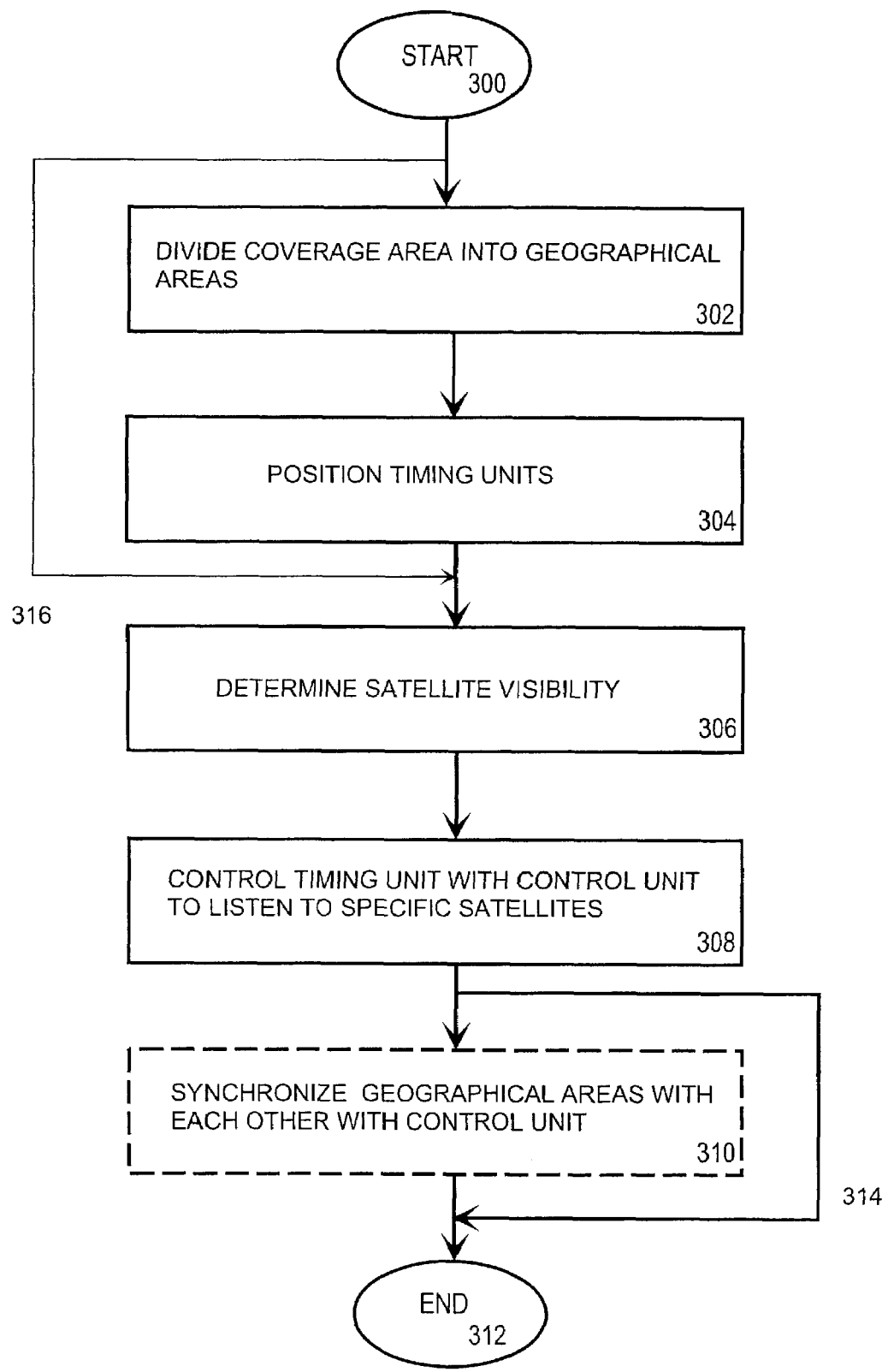
FIG. 3 illustrates a flow chart.

The following describes, for the sake of clarity, a simplified example of a part of a ground network system to which the control method of FIG. 3 can be applied. The invention can be applied to systems that need accurate synchronization information. In the example of FIG. 4, the ground network system is a radio communication system. In the example of FIG. 4, the presented radio communication system is a UMTS system, and the satellite system is a GPS system. It will be obvious to a person skilled in the art that the radio communication system or the satellite system can deviate from what is presented in FIG. 4. The radio communication system can be in a GSM system, for example. The satellite system can also naturally be other than the GPS system. In the example of FIG. 4, the timing unit and its control unit are shown, for illustrative reasons, partly as units according to the GPS system, but it will be obvious to a person skilled in the art that depending on the object of application, they can conform to another standard where required. If the application allows, the timing unit and/or its control unit can also be independent from standards.

In FIG. 4, a control unit 402 of the timing unit is positioned in the base transceiver station 146. The control unit 402 can also be positioned in another part of the network. The control unit determines, for instance on the basis of the measurement results received from the timing unit and the satellite visibility table stored in its memory, which satellites the timing unit will listen to, and transmits control commands relating to this to the timing unit. For instance, the functions of the control unit can be included to be performed by the SMLC unit, i.e. the serving mobile location centre, used with GPS systems, as separate software.

In FIG. 4, a timing unit 400 is positioned separately from the base transceiver stations 142, 144. The timing unit can also have a connection to them either within the base transceiver station or in connection with the radio mast it uses. The timing unit interprets a control signal of the control unit, which comprises a command concerning the satellites to be listened to. The timing unit preferably comprises an antenna or has a connection to an antenna, a receiver, a measurement unit, a memory, and the required data transmission connection to the control unit of the timing unit. The timing unit can also comprise other parts. In many positioning applications, the timing unit is typically positioned in a known place and it measures the timing difference of the downlink signals it receives. Also the subscriber terminal measures corresponding signals and the calculation centre can thus position the subscriber terminal by utilizing measurement results of both the subscriber terminal and the timing unit. Examples of positioning methods have been described above. In the example of FIG. 4, the functions of the timing unit are included to be performed by the LMU, i.e. the location measurement unit, as separate software.

In addition, the system also comprises a satellite 404, which comprises a clock, typically an atomic clock, a radio receiver and transceiver and an antenna. The satellite can also comprise other parts. Further, satellite systems typically comprise at least one control unit and antenna positioned on earth, and a monitoring centre.

FIG. 5 shows a simplified example of the control unit of the timing unit. It will be obvious to a person skilled in the art that the control unit of the timing unit can also comprise parts other than the ones shown in FIG. 5. In order to implement the method according to the invention, the control unit must determine, for instance on the basis of the measurement results received from the timing unit and the visibility table stored in its memory, which satellites the timing unit will listen to, and transmit a control command relating to this to the timing unit. The control unit thus receives and interprets the message or report sent by the timing unit and containing measurement information.

The control unit according to the example of FIG. 5 comprises a memory 500, in which there are stored the visibility table of the satellites and the possible measurement results received from the timing unit as well as the values calculated from the measurement results, such as the average of the signal strengths. Determination of the satellites that the timing unit is commanded to listen to or that the timing unit is prohibited to listen to takes place in a calculation centre 502. The command to the timing unit is transmitted as an output signal of the calculation centre. The controller 504 controls the calculation centre by, for example, reporting the threshold value. The controller also transmits inter-control-unit information in order to synchronize several geographical areas, for example.

Figure 6:
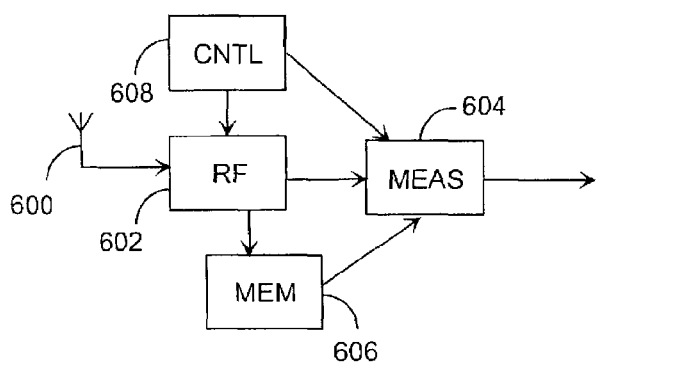
FIG. 6 illustrates an example of a timing unit.

The following describes a timing unit with reference to the simplified example of FIG. 6. It will be obvious to a person skilled in the art that the timing unit can also comprise parts other than those shown in FIG. 6. The timing unit of FIG. 6 comprises an antenna (or an antenna array) 600 or has a connection to it; a radio receiver 602; a measurement unit 604; and a memory 606.

The radio receiver comprises typical radio receiver parts, including an antenna amplifier or a preamplifier, which is essential particularly in satellite systems in order to achieve sufficiently great power for the received signal in the receiver; and radio frequency parts, in which the signal is converted to an appropriate frequency for processing and usually also A/D-converted. Radio receivers are generally known in the field and are thus not described in more detail here.

The measurement unit measures the strength of the received signal or other variable expressing its quality. The variables to be measured vary according to the object of application. The measurements can be performed from either an analogue or a digital signal. If the measurements are performed from an analogue signal, no A/D converter is required. The memory 606 is preferably a typical buffer memory for storing received signal components. In many positioning systems, the timing unit is typically positioned in a known place and it measures the timing difference between the signals it has received in order to position user devices. The timing unit has a connection to the control unit of the timing unit in order to transmit information. The timing unit also comprises a controller 608, which receives the commands arriving from the control unit of the timing unit and controls functions of the timing unit on the basis of the commands.

The functions according to the invention can typically be implemented by software by including the software comprising the required commands in the use of the timing unit and/or the control unit of the timing unit. The invention can also be implemented for instance with software solutions providing the required functionality, for example as an ASIC (Application Specific Integrated Circuit) or separate logic components.

Although the invention has been described above with reference to the example according to the attached drawings, it is obvious that the invention is not restricted to it but can be modified in a plurality of ways within the inventive idea of the attached claims.

We claim:

1. A method for controlling a satellite communication system, the method comprising:
    dividing the coverage area of the satellite communication system into one or several geographical areas;
    positioning one or several timing units in at least one geographical area;
    determining which of a plurality of satellites of the satellite communication system are visible in each particular geographical area;
    controlling the timing unit with a control unit, in order to minimize the time difference within the system, to listen to one or several satellites visible in each particular geographical area, the signals received from the satellites by the timing unit fulfilling a predetermined condition,
    wherein the satellite communication system includes a plurality of satellites and ground network system devices positioned on earth.

2. A method for controlling a satellite communication system, the method comprising:
    dividing the coverage area of the satellite communication system into one or several geographical areas;
    positioning one or several timing units in at least one geographical area;
    determining which of a plurality of satellites of the satellite communication system are visible in each particular geographical area;
    controlling the timing unit with a control unit, in order to minimize the time difference within the system, to listen to one or several satellites visible in each particular geographical area, the signals received from the satellites by the timing unit fulfilling a predetermined condition;
    synchronizing a predetermined number of geographical areas with each other by means of the control unit of the system in such a way that the time difference within the system is minimized in a predetermined combination area of geographical areas,
    wherein the satellite communication system includes a plurality of satellites and ground network system devices positioned on earth.

3. A method according to claim 1, wherein the geographical area is a radio cell of a cellular system.

4. A method according to claim 1, wherein the satellites to be listened to are determined with measurements of the timing unit.

5. A method according to claim 1, wherein the control unit is positioned in a unit controlling the base transceiver stations of the ground network.

6. A method according to claim 1, wherein the timing unit is positioned in a base transceiver station or a radio mast of the ground network system.

7. A method according to claim 1, further comprising selecting that satellite from which the timing unit receives the strongest signal to be listened to.

8. A method according to claim 1, further comprising selecting those satellites, received by the timing unit, whose signal strengths exceed a set threshold value to be listened to.

9. A method according to claim 1, further comprising selecting those satellites, received by the timing unit, whose signal strengths exceed a set threshold value during the whole of the 24 hours to be listened to.

10. A method according to claim 1, wherein the control unit gives a command about which satellites the timing unit will not listen to.

11. A method according to claim 1, wherein the control unit gives a command about which satellites the timing unit will listen to.

12. A method according to claim 2, further comprising synchronizing a predetermined number of geographical areas with each other with the control unit of the system in such a way that the control units determine the timing units to listen to at least substantially the same satellites.

13. A control unit of a timing unit in a satellite communication system comprising:
    determining unit configured to determine which of the satellites of the satellite communication system are visible in each particular geographical area;
    controlling unit configured to control the timing unit, in order to minimize the time difference within the system, to listen to one or several of the satellites visible in each particular geographical area, the signals received from the satellites by the timing unit fulfilling a predetermined condition.

14. A control unit of a timing unit in a satellite communication system comprising:
    determining unit configured to determine which of the satellites of the satellite communication system are visible in each particular geographical area;
    controlling unit configured to control the timing unit, in order to minimize the time difference within the system, to listen to one or several of the satellites visible in each particular geographical area, the signals received from the satellites by the timing unit fulfilling a predetermined condition;
    synchronizing unit configured to synchronize a predetermined number of geographical areas with each other in such a way that the time difference within the system is minimized in a predetermined combination area of geographical areas.

15. A control unit according to claim 13, wherein the control unit is positioned in a unit controlling the base transceiver stations of the ground network system.

16. A control unit according to claim 13, wherein that satellite from which the timing unit receives the strongest signal is selected to be listened to.

17. A control unit according to claim 13, wherein those satellites, received by the timing unit, whose signal strengths exceed a set threshold value are selected to be listened to.

18. A control unit according to claim 13, wherein those satellites, received by the timing unit, whose signal strengths exceed a set threshold value during the whole of the 24 hours are selected to be listened to.

19. A control unit according to claim 13, wherein the control unit gives a command about which satellites the timing unit will not listen to.

20. A control unit according to claim 13, wherein the control unit gives a command about which satellites the timing unit will listen to.

21. A control unit according to claim 13, wherein the control unit receives and interprets a signal transmitted by the timing unit and containing measurement information.

22. A timing unit of a satellite communication system comprising:
receiving unit configured to control commands from the control unit of the timing unit in order to minimize the time difference within the system, the control commands being used to control the timing unit to listen to one or several of the satellites visible in each particular geographical area, the signals received from the satellites fulfilling a predetermined condition.

23. A timing unit according to claim 22, wherein the satellites to be listened to are determined by means of measurements.

24. A timing unit according to claim 22, wherein the control unit is positioned in a unit controlling the base transceiver stations of the ground network system.

25. A timing unit according to claim 22, wherein the timing unit is positioned in a base transceiver station or a radio mast of the ground network system.

26. A timing unit according to claim 22, wherein that satellite from which the timing unit receives the strongest signal is selected to be listened to.

27. A timing unit according to claim 22, wherein those satellites, received by the timing unit, whose signal strengths exceed a set threshold value are selected to be listened to.

28. A timing unit according to claim 22, wherein those satellites, received by the timing unit, whose signal strengths exceed a set threshold value during the whole of the 24 hours are selected to be listened to.

29. A timing unit according to claim 22, wherein a control command determines which satellites the timing unit will not listen to.

30. A timing unit according to claim 22, wherein a control command determines which satellites the timing unit will listen to.

31. A control unit of a timing unit in a satellite communication system comprising:
determining means for determining which of the satellites of the satellite communication system are visible in each particular geographical area; and
control means for controlling the timing unit, in order to minimize the time difference within the system, to listen to one or several of the satellites visible in each particular geographical area, the signals received from the satellites by the timing unit fulfilling a predetermined condition.

32. A timing unit of a satellite communication system comprising:
receiving means for receiving control commands from the control unit of the timing unit in order to minimize the time difference within the system, the control commands being used to control the timing unit to listen to one or several of the satellites visible in each particular geographical area, the signals received from the satellites fulfilling a predetermined condition.

* * * * *